(12) United States Patent
Masuda et al.

(10) Patent No.: US 10,094,656 B2
(45) Date of Patent: Oct. 9, 2018

(54) CHROMATIC CONFOCAL SENSOR AND MEASUREMENT METHOD

(71) Applicant: MITUTOYO CORPORATION, Kanagawa (JP)

(72) Inventors: Norihiko Masuda, Kanagawa (JP); Koji Kubo, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 16 days.

(21) Appl. No.: 15/417,751

(22) Filed: Jan. 27, 2017

(65) Prior Publication Data

US 2017/0227352 A1  Aug. 10, 2017

(30) Foreign Application Priority Data

Feb. 5, 2016  (JP) .................................. 2016-020524

(51) Int. Cl.
| | |
|---|---|
| *G01B 11/14* | (2006.01) |
| *G01B 11/04* | (2006.01) |
| *G01B 11/00* | (2006.01) |

(52) U.S. Cl.
CPC ............ *G01B 11/14* (2013.01); *G01B 11/002* (2013.01); *G01B 11/04* (2013.01); *G01B 2210/50* (2013.01)

(58) Field of Classification Search
CPC ................................................ G01B 2210/50
See application file for complete search history.

(56) References Cited

U.S. PATENT DOCUMENTS

| | | | |
|---|---|---|---|
| 8,587,772 B2 | 11/2013 | Sesko et al. | |
| 9,563,001 B2 | 2/2017 | Masuda et al. | |
| 2009/0021750 A1* | 1/2009 | Korner .................. | G01B 11/25 356/601 |
| 2011/0013186 A1* | 1/2011 | Miki .................... | G01B 11/026 356/364 |
| 2014/0232855 A1 | 8/2014 | Yamagata et al. | |

FOREIGN PATENT DOCUMENTS

| | | |
|---|---|---|
| JP | 2011-039026 A | 2/2011 |
| JP | 2013-130581 A | 7/2013 |

\* cited by examiner

*Primary Examiner* — Shawn Decenzo
(74) *Attorney, Agent, or Firm* — Greenblum & Bernstein, P.L.C.

(57) ABSTRACT

Provided is a chromatic confocal sensor including: a first light source that emits measurement light including a plurality of light beams having different wavelengths; a second light source that emits a visible light beam having a predetermined wavelength; an optical head that causes incident light to be converged at a focal position corresponding to a wavelength of the incident light and outputs reflection light reflected by an object to be measured at the focal position; a position calculation section that calculates a position of the object to be measured on the basis of the reflection light output by the optical head; and a switching section that selectively switches between a first operation in which only the measurement light enters the optical head and a second operation in which at least the visible light beam enters the optical head.

8 Claims, 5 Drawing Sheets

CHROMATIC CONFOCAL SENSOR AND MEASUREMENT METHOD

CROSS REFERENCE TO RELATED APPLICATIONS

This application claims the benefit of Japanese Priority Patent Application JP 2016-020524 filed Feb. 5, 2016, the entire contents of which are incorporated herein by reference.

BACKGROUND

The present invention relates to a chromatic confocal sensor and a measurement method that uses it.

From the past, the chromatic confocal technique has been used for measuring a height of an object to be measured and the like. For example, Japanese Patent Application Laid-open No. 2011-39026 (hereinafter, referred to as Patent Document 1) discloses a chromatic confocal displacement meter (hereinafter, referred to as chromatic sensor) as shown in FIG. 1. In the chromatic sensor, a color to be focused on a work changes on a one-on-one basis according to a height (displacement) of the work. By extracting light of a color to be focused on the work and specifying the color (optical wavelength), the height of the work that is in a one-on-one relationship with the color is measured (paragraphs [0002], [0003], etc. in specification of Patent Document 1).

A chromatic point sensor system disclosed in Japanese Patent Application Laid-open No. 2013-130581 (hereinafter, referred to as Patent Document 2) includes a light source and first and second optical paths connected thereto as shown in FIG. 1. By using the first optical path that is an optical path of a confocal system, a first output spectral profile including distance-dependent and distance-independent components is obtained. By using the second optical path, a second output spectral profile including a distance-independent component (without distance-dependent component) is obtained. By correcting the first output spectral profile on the basis of the second output spectral profile, it becomes possible to correct a measurement error arising from a change in measurement condition, in particular, a measurement error arising from spectral reflectance characteristics specific to a work (paragraphs [0009], [0013], [0029]-[0032], etc. of Patent Document 2).

SUMMARY

When the chromatic sensor is used, it is desirable to accurately radiate measurement light to a point that is a measurement target on an object to be measured. For example, when the object to be measured is a member made of transparent material or the like, it may be difficult to view an irradiation spot of the measurement light. In this case, it is difficult to precisely radiate the measurement light to a measurement point.

In view of the above-mentioned circumstances, it is an object of the present invention to provide a chromatic confocal sensor capable of easily and precisely radiating measurement light to a measurement point, and a measurement method.

For accomplishing the above-mentioned object, a chromatic confocal sensor according to an embodiment of the present invention includes a first light source, a second light source, an optical head, a position calculation section, and a switching section.

The first light source emits measurement light including a plurality of light beams having different wavelengths.

The second light source emits a visible light beam having a predetermined wavelength.

The optical head causes incident light to be converged at a focal position corresponding to a wavelength of the incident light and outputs reflection light reflected by an object to be measured at the focal position.

The position calculation section calculates a position of the object to be measured on the basis of the reflection light output by the optical head.

The switching section selectively switches between a first operation in which only the measurement light enters the optical head and a second operation in which at least the visible light beam enters the optical head.

This chromatic confocal sensor includes the first light source that emits the measurement light and the second light source that emits the visible light beam. A position of an irradiation spot in the first operation in which the measurement light is radiated toward the object to be measured from the optical head and a position of an irradiation spot in the second operation in which the visible light beam is radiated are identical to each other. Therefore, by adjusting the position of the irradiation spot of the visible light beam, which is easily viewed, to the measurement point, it becomes possible to easily and precisely radiate the measurement light to the measurement point.

The second light source may be a laser light source or an LED (Light Emitting Diode) light source.

Accordingly, the position adjustment of the irradiation spot can be easily and precisely executed.

The visible light beam may be red light, blue light, or green light.

Accordingly, the position adjustment of the irradiation spot can be easily and precisely executed.

The switching section may include an optical fiber section that guides the measurement light emitted from the first light source and the visible light beam emitted from the second light source to the optical head, and a light source control section that controls driving of each of the first light source and the second light source.

By using a fiber splitter, it becomes possible to easily switch between emission of the measurement light and emission of the visible light beam to the optical head.

The position calculation section may include a spectroscope and a processing/control section.

The spectroscope includes a diffraction grating that diffracts the reflection light output by the optical head, and a sensor that receives diffraction light diffracted by the diffraction grating.

The processing/control section calculates the position of the object to be measured on the basis of a light reception position of the diffraction light received by the sensor.

The position of the object to be measured can be precisely calculated by the spectroscope and the processing/control section.

The switching section may switch between the first operation and the second operation every time interval of $1/10$ seconds or less.

Accordingly, position measurement can be performed while checking the position of the irradiation spot.

The position calculation section may generate, when the second operation is selected, a correction value used for calculating the position, on the basis of the reflection light obtained by the visible light beam being reflected by an object to be measured for correction at the focal position.

Accordingly, the position of the object to be measured can be calculated with high precision.

The processing/control section may generate the correction value on the basis of a light reception position of the diffraction light obtained by the reflection light reflected by the object to be measured for correction being diffracted by the diffraction grating.

Accordingly, the correction value can be easily calculated.

A measurement method according to an embodiment of the present invention includes causing a visible light beam having a predetermined wavelength to enter an optical head.

A position of an irradiation spot of the visible light beam emitted toward an object to be measured from the optical head is moved onto a measurement point on the object to be measured.

A measurement light including a plurality of light beams having different wavelengths enters the optical head.

The optical head converges the plurality of light beams on different focal positions and outputs reflection light reflected by the object to be measured at the focal position.

The position of the object to be measured is calculated on the basis of the reflection light output by the optical head.

The measurement method may further include: emitting the visible light beam toward an object to be measured for correction from the optical head; and generating a correction value used for calculating the position, on the basis of the reflection light reflected by the object to be measured for correction at the focal position and output by the optical head.

As described above, according to the present invention, it becomes possible to easily and precisely radiate measurement light to a measurement point. It should be noted that the effects described herein are not necessarily limited, and any of the effects described in the present disclosure may be obtained.

DETAILED DESCRIPTION OF EMBODIMENTS

Hereinafter, an embodiment of the present invention will be described with reference to the drawings.

Figure 1:
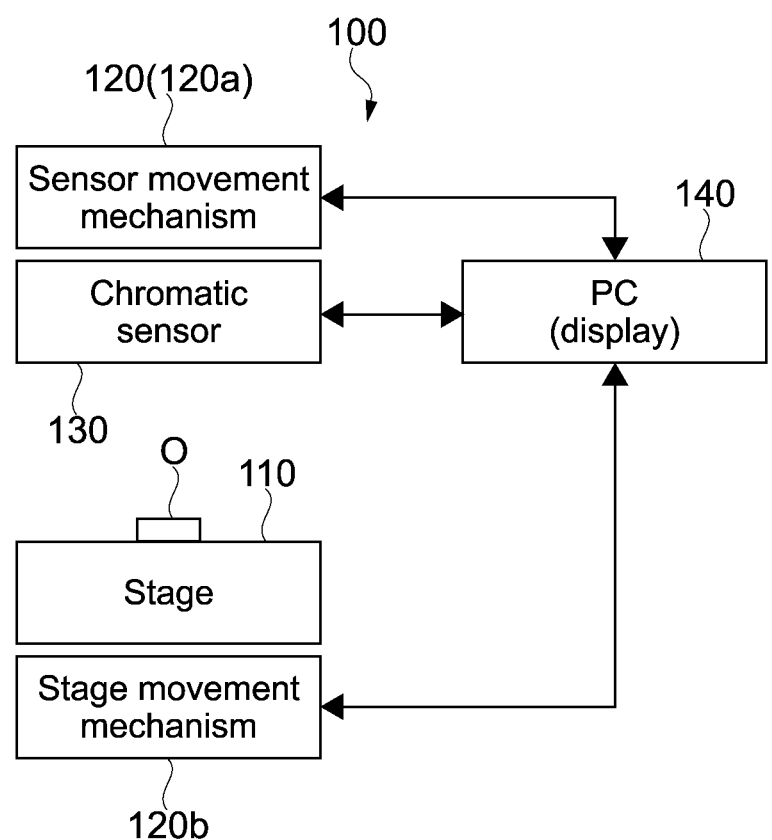
FIG. 1 is a block diagram schematically showing a configuration example of a contactless measurement system according to an embodiment of the present invention.

FIG. 1 is a block diagram schematically showing a configuration example of a contactless measurement system according to an embodiment of the present invention. A contactless measurement system 100 includes a stage 110, a movement mechanism 120, a chromatic confocal sensor (hereinafter, simply referred to as chromatic sensor) 130, and a PC (Personal Computer) 140. An object to be measured O is placed at a predetermined position on the stage 110.

The movement mechanism 120 includes a sensor movement mechanism 120a that moves the chromatic sensor 130 and a stage movement mechanism 120b that moves the stage 110. By driving the sensor movement mechanism 120a and the stage movement mechanism 120b, a relative position of the chromatic sensor 130 with respect to the object to be measured O can be moved in three-dimensional directions.

In this embodiment, the sensor movement mechanism 120a moves the optical head 10 (see FIG. 2) of the chromatic sensor 130. Alternatively, the whole of the chromatic sensor 130 including the optical head 10, a controller 20, and an optical fiber section 30 may be integrally moved. A specific configuration of the movement mechanism 120 is not limited and may be arbitrarily designed.

The PC 140 is connected to each of the movement mechanism 120 and the chromatic sensor 130 in an arbitrary connection form. The PC 140 is capable of controlling driving of each of the movement mechanism 120 and the chromatic sensor 130. For example, when a plurality of measurement points are set on the object to be measured O, a plurality of coordinate values for measuring the measurement points are input into the PC 140. The PC 140 automatically moves a position of the chromatic sensor 130 on the basis of the input coordinate values.

An operator can also operate the PC 140 to control driving of each of the movement mechanism 120 and the chromatic sensor 130. For example, the operator can adjust a measurement position of the chromatic sensor 130.

Although the illustration is omitted in FIG. 1, a camera capable of capturing the object to be measured O on the stage 110 is provided in this contactless measurement system 100. An image captured by such a camera is displayed on a display of the PC 140 and adjustment or the like of the measurement position is performed while viewing the displayed image. It should be noted that embodiments of the present invention are not limited to the example in which the camera is provided and the position adjustment may be performed while viewing the object to be measured O with naked eyes.

The PC 140 includes hardware necessary for a computer configuration, for example, a CPU (Central Processing Unit), a ROM (Read Only Memory), a RAM (Random Access Memory), and an HDD (Hard Disk Drive). Moreover, control of the PC 140 is realized by, for example, the CPU loading a predetermined program stored in the ROM, the HDD, or the like into the RAM and executing it. The program may be installed in the PC by using any method.

Figure 2:
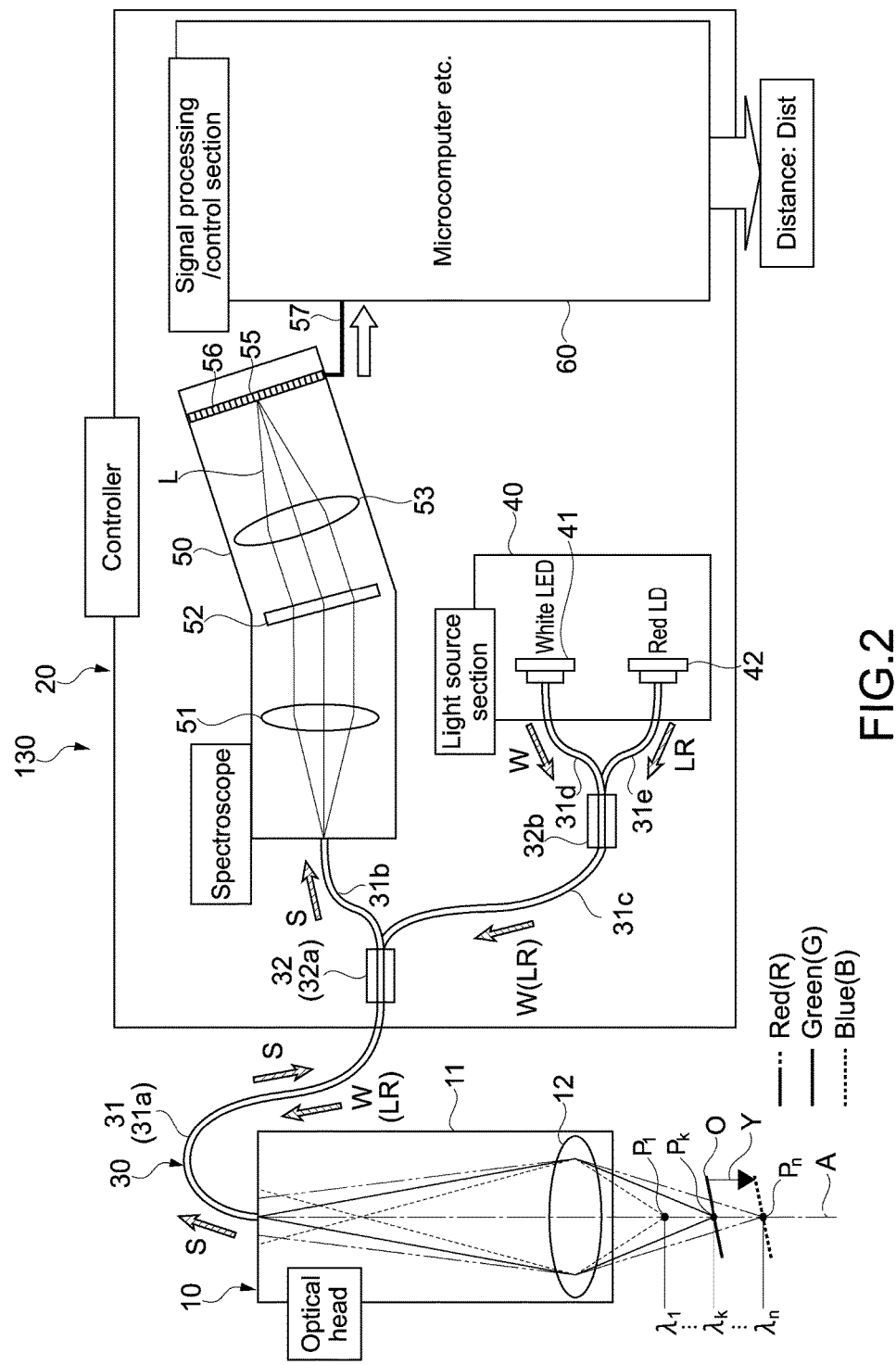
FIG. 2 is a schematic diagram showing a configuration example of a chromatic sensor shown in FIG. 1.

FIG. 2 is a schematic diagram showing a configuration example of the chromatic sensor 130. The chromatic sensor 130 includes an optical head 10, a controller 20, and an optical fiber section 30. The controller 20 includes a light source section 40, a spectroscope 50, and a signal processing/control section (hereinafter, simply referred to as control section) 60.

As shown in FIG. 2, the light source section 40 includes a measurement light source 41 that emits measurement light and a guide light source 42 that emits guide light. In this embodiment, a white LED light source is used as the measurement light source 41. Therefore, the measurement light source 41 emits white light W including a plurality of visible light beams having different wavelengths from a blue wavelength range to a red wavelength range, as the measurement light.

In this embodiment, the measurement light source 41 corresponds to a first light source. Moreover, the plurality of visible light beams correspond to a plurality of light beams having different wavelengths. It should be noted that other white light sources such as a mercury-vapor lamp may be used in place of the LED light sources.

A red laser light source that emits red laser light LR is used as the guide light source 42. In this embodiment, the guide light source 42 corresponds to a second light source. Moreover, the red laser light LR used as the guide light corresponds to a visible light beam having a predetermined wavelength. It should be noted that the color of the guide light is not limited and other monochromatic light such as blue light and green light may be used. Alternatively, another solid-state light source such an LED light source may be used as the guide light source 42.

The optical fiber section 30 includes a plurality of optical fibers 31 and a plurality of fiber splitters 32. In this embodiment, fiber splitters 32*a* and 32*b*, an optical fiber 31*a* connected to the optical head 10, and an optical fiber 31*b* connected to the spectroscope 50 are used. An optical fiber 31*c* through which the fiber splitters 32*a* and 32*b* are connected to each other, an optical fiber 31*d* connected to the measurement light source 41, and an optical fiber 31*e* connected to the guide light source 42 are further used.

As shown in FIG. 2, the fiber splitter 32*a* is capable of splitting light input from the optical fiber 31*a* and outputting it to the optical fiber 31*b*. Moreover, light input from the optical fiber 31*c* can be output to the optical fiber 31*a*. The fiber splitter 32*b* is capable of outputting light input from each of the optical fibers 31*d* and 31*e* to the optical fiber 31*c*.

Therefore, when the measurement light source 41 and the guide light source 42 are driven, each of the white light W and the red laser light LR is guided to the optical head 10 via the optical fiber section 30. Moreover, reflection light S (to be described later in detail) output from the optical head 10 is guided to the spectroscope 50 via the optical fiber section 30. It should be noted that optical fiber couplers may be used in place of the fiber splitters 32.

As shown in FIG. 2, the optical head 10 includes a pen-shaped casing section 11 having an optical axis A in a longitudinal direction thereof and an objective lens 12 provided inside the casing section 11. The optical fiber 31*a* is connected at substantially the center of a rear end of the casing section 11. Light emitted from the optical fiber 31*a* is radiated toward an object to be measured O from a front end of the casing section 11 via the objective lens 12.

The objective lens 12 is a lens having a large chromatic aberration and converges light entering the optical head 10 at a focal position P corresponding to a wavelength λ on the optical axis A. For example, white light W that is the measurement light enters the optical head 10. In this case, the objective lens 12 causes a plurality of visible light beams of the white light W to converge at different focal positions P corresponding to the wavelengths λ.

Therefore, the plurality of visible light beams of the white light W are separated from one another through the objective lens 12 and emitted toward the object to be measured O from the front end of the casing section 11. In FIG. 2, light beams of 3 colors of RGB are illustrated, representing the plurality of visible light beams split by the objective lens 12. As a matter of course, light beams having other colors (other wavelength ranges) are also emitted.

Wavelength λ1 and focal position P1 shown in FIG. 2 represent wavelength and focal position of visible light having a shortest wavelength out of the plurality of visible light beams and correspond to blue light B, for example. Wavelength λn and focal position Pn represent wavelength and focal position of visible light having a longest wavelength out of the plurality of visible light beams and correspond to red light R, for example. Wavelength λk and focal position Pk represent wavelength and focal position of arbitrary visible light out of the plurality of visible light beams and correspond to green light G in FIG. 2 (k=1 to n).

Moreover, the objective lens 12 causes the visible light reflected by the object to be measured O at the focal position Pk to converge at the optical fiber 31*a*. Therefore, the optical fiber 31*a* connected to the rear end of the casing section 11 is connected at a confocal position at which the visible light focused on and reflected by the object to be measured O is converged by the objective lens 12. Accordingly, visible light reflected by the object to be measured O at the focal position Pk out of the plurality of visible light beams can be selected. The reflection light S reflected on the object to be measured O is output via the optical fiber 31*a*.

In FIG. 2, light beams of 3 colors of RGB reflected by the object to be measured O are illustrated between the objective lens 12 and the optical fiber 31*a*. In the example shown in FIG. 2, the object to be measured O is present at the focal position Pk (focal position of green light G in figure). Therefore, green light G reflected by the object to be measured O is converged at the optical fiber 31*a*. As a result, the reflection light S of the green light G is output via the optical fiber 31*a*. The wavelength of the thus output the reflection light S and the position of the object to be measured O on the optical axis A are in a one-to-one relationship.

When the red laser light LR that is the guide light enters the optical head 10, such red laser light LR is emitted toward the object to be measured O. A diameter of an irradiation spot of the red laser light LR on the object to be measured O is, for example, approximately several μm, and it is sufficiently visible on the display. As a matter of course, the red laser light LR may be radiated such that it has an irradiation spot having a size visible to the naked eye.

When the object to be measured O is present at a focal position Pn of the red light R, the red laser light LR is focused on the object to be measured O, and hence the diameter of the irradiation spot becomes smaller. On the other hand, when the object to be measured O is present at a focal position of other monochromatic light, the diameter of the irradiation spot of the red laser light LR becomes slightly larger. However, visibility of the irradiation spot is little affected. That is, even when the object to be measured O is present at any position, it is possible to sufficiently view the irradiation spot of the red laser light LR.

It should be noted that the object to be measured O is present at the focal position Pn of the red light R, the reflection light S of the red laser light LR reflected by the object to be measured O is output via the optical fiber 31*a*.

An internal configuration of the optical head 10 is not limited and may be appropriately designed. For example, other lenses such a pin hole and a collimator lens may be used.

The spectroscope 50 is a block for detecting a wavelength of the reflection light S output by the optical head 10 via the optical fiber 31*a*. The reflection light S is radiated inside the spectroscope 50 via the optical fiber 31*a*, the fiber splitter 32*a* and the optical fiber 31*b*.

The spectroscope 50 includes a collimator lens 51, a diffraction grating 52, an imaging lens 53, and a linear sensor 55. Those members are arranged in the stated order from a side on which the reflection light S enters. The collimator lens 51 substantially uniformly radiates the reflection light S emitted from the optical fiber 31*b* onto the diffraction grating 52.

The diffraction grating 52 diffracts the reflection light S output by the optical head 10. The imaging lens 53 images, in spots, diffraction light beams L diffracted by the diffraction grating 52 on the linear sensor 55. Although +1-order diffracted light beams L are typically imaged on the linear sensor 55, other diffraction light beams such as −1-order diffracted light beams may be imaged on. It should be noted that a specific structure of the diffraction grating 52 is not limited.

The linear sensor 55 includes a plurality of pixels (light reception devices) 56 arranged in one direction. Each pixel 56 outputs a signal corresponding to an intensity of received light. The specific structure of the linear sensor 55 is not limited, and a CMOS line sensor, a CCD line sensor, or the like is used.

It should be noted that the imaging lens 53 is a lens having a small chromatic aberration and is capable of imaging the diffraction light beams L1 in spots on the linear sensor 55 irrespective of the wavelength of the reflection light S. On the other hand, an emission angle of the diffraction light beams L emitted from the diffraction grating 52 depends on the wavelength of the reflection light S. Therefore, positions of spots on the linear sensor 55 become parameters depending on the wavelength of the reflection light S Signals output from the linear sensor 55 are transmitted to a control section 60 via a signal cable 57. It should be noted that a light shield mechanism or the like may be provided inside the spectroscope 50 such that diffraction light excluding diffraction light L that becomes a spot-position detection target does not enter the linear sensor 55. Moreover, arrangement angles and the like of the diffraction grating 52 and the linear sensor 55 may be appropriately adjusted.

The control section 60 functions as a position calculation section in this embodiment and calculates the position of the object to be measured O on the basis of signals received from the linear sensor. For example, the optical head 10 is held at a predetermined reference position and the white light W is emitted to the object to be measured O. Then, on the basis of the signals from the linear sensor 55, the position of the object to be measured O is calculated with the reference position being a reference.

Moreover, as the position of the object to be measured O, a distance between the optical head 10 and the object to be measured O may be calculated. Moreover, even when the object to be measured O moves, a movement amount of the object to be measured O can also be calculated on the basis of the signals from the linear sensor 55 that are output in correspondence with the movement (see arrow Y of FIG. 2).

When the optical head 10 is used above the object to be measured O, the height of the object to be measured O is calculated as the position of the object to be measured O, though of course not limited thereto. The optical head 10 may be used in an arbitrary direction and a position in that direction may be calculated.

Moreover, the control section 60 also functions as a light source control section that controls driving of each of the measurement light source 41 and the guide light source 42. For example, the control section 60 is capable of switching between emission of the white light W that is performed by the measurement light source 41 and emission of the red laser light LR that is performed by the guide light source 42 and executing it every predetermined time. Otherwise, the control section 60 is also capable of switching ON/OFF of the red laser light LR in a state in which the white light W is constantly emitted.

The control section 60 can be realized by a microcomputer in which a CPU, a memory (RAM, ROM), an I/O (Input/Output), and the like are accommodated in a single chip, for example. Various types of processing of the microcomputer are executed by the CPU in the chip operating according to a predetermined program stored in the memory, though not limited thereto. For realizing the control section 60, other ICs (integrated circuits) or the like may be used as appropriate.

In this embodiment, the switching section can be realized by the optical fiber section 30 and the control section 60 that functions as the light source control section. The switching section is capable of selectively switching between a first operation in which only the white light W enters the optical head 10 and a second operation in which at least the red laser light LR enters the optical head 10.

For example, the first operation is executed by the control section 60 driving only the measurement light source 41. Moreover, the second operation is executed by driving at least the guide light source 42. The first and second operations can be switched to each other every predetermined time by switching/driving of each of the measurement light source 41 and the guide light source 42 every predetermined time.

In the second operation, the measurement light source 41 may be driven. That is, ON/OFF of driving of the guide light source 42 may be switched in a state in which the measurement light source 41 is constantly driven. In this case, OFF-time of the guide light source 42 corresponds to the first operation and ON-time corresponds to the second operation.

It should be noted that a block that functions as the light source control section may be provided other than the control section 60. That is, the light source control section may be configured separately from the block that calculates the position of the object to be measured O.

Figure 3:
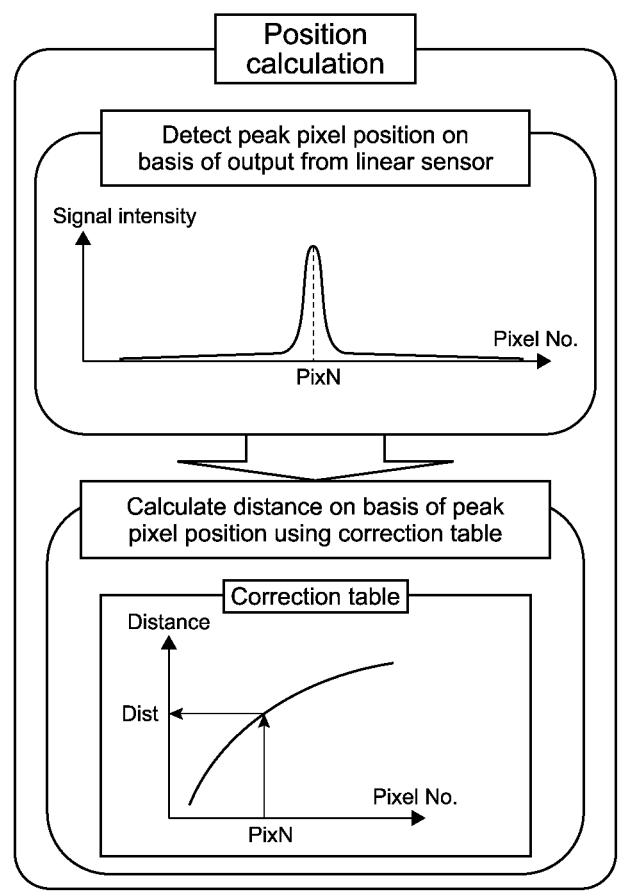
FIG. 3 is a chart showing a calculation example of a position of an object to be measured that is performed by a control section.

FIG. 3 is a chart showing a calculation example of the position of the object to be measured O that is performed by the control section 60. First of all, the position of a pixel 56 that outputs a signal intensity peak value (peak pixel position) is detected on the basis of a signal output from the linear sensor 55. The peak pixel position corresponds to a light reception position of the diffraction light L received by the sensor. In this embodiment, the peak pixel position is indicated by a pixel number.

The position of the object to be measured O (here, referred to as distance Dist) is calculated on the basis of the detected pixel number. As shown in FIG. 3, the distance Dist is calculated by using a correction table. The correction table is created in advance by operating the chromatic sensor 130 while adjusting the distance Dist and is stored in the memory of the control section 60 or the like. The method of creating the correction table, the creation timing, and the like are not limited.

The calculation of the distance Dist is not limited to the method of using the correction table. For example, it is also possible for a predetermined operational expression to be stored in the memory or the like so that the distance Dist is calculated on the basis of the pixel number using the operational expression. Alternatively, the wavelength of the reflection light S may be calculated on the basis of the pixel number. In addition, the distance Dist may be calculated on the basis of the wavelength using the correction table, operation, and the like.

Figure 4:
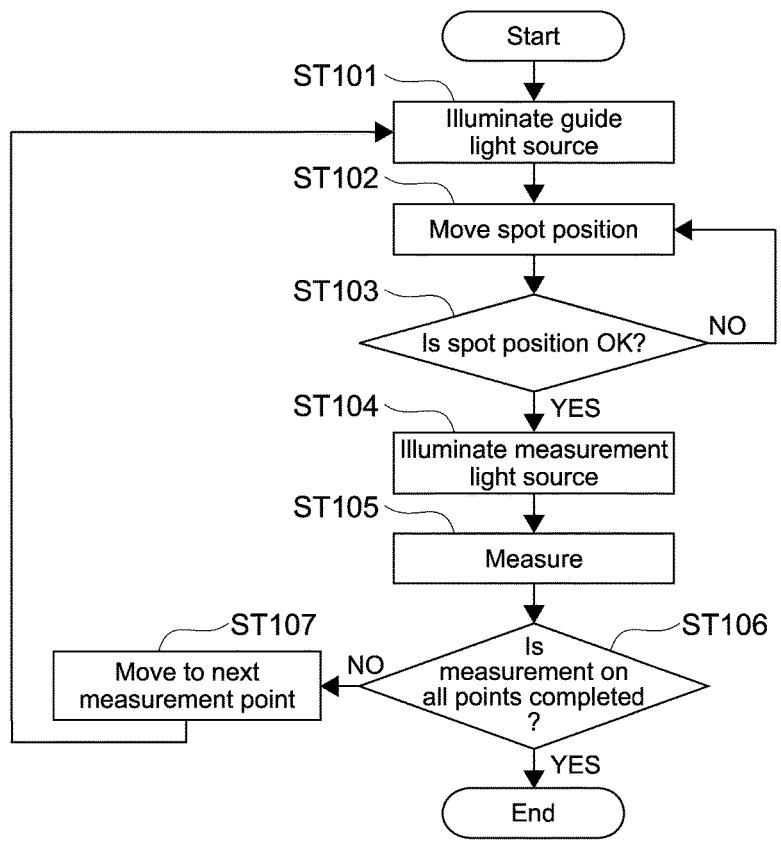
FIG. 4 is a flowchart showing an example of a measurement operation of the contactless measurement system.

FIG. 4 is a flowchart showing an example of the measurement operation of the contactless measurement system 100. First of all, the guide light source 42 is illuminated (Step 101). The position of the irradiation spot of the red laser light LR is moved to a measurement point on the object to be measured O (Step 102). Typically, the movement mechanism 120 is controlled by the operator operating the PC 140 on the basis of an image captured by the camera. As a matter of course, the position adjustment may be performed while viewing with naked eyes.

Moreover, the position of the irradiation spot may be automatically adjusted on the basis of the image captured by the camera. For example, the coordinate value of the irradiation spot in red is calculated on the basis of the image. The movement mechanism 120 is controlled such that that coordinate value is equal to a coordinate value of the measurement point. Accordingly, it becomes possible to execute automatic measurement with high accuracy.

Whether or not the position of the irradiation spot is adjusted is determined (Step 103). Typically, the operator inputs an operation indicating the fact that the position adjustment is completed. When that input is made, it is determined that the spot position is OK (Yes in Step 103). Until the operation indicating the fact that the position adjustment is completed is input, the position adjustment is executed (No in Step 103).

When the position adjustment of the irradiation spot is completed, the measurement light source 41 is illuminated (Step 104). The position of the irradiation spot of the white light W is identical to the position of the irradiation spot of the red laser light LR. Therefore, the white light W is precisely radiated to the measurement point and a position in that measurement point is measured with high accuracy (Step 105).

Whether or not measurement in all the measurement points is completed is determined (Step 106). When the measurement is not completed (No in Step 106), the chromatic sensor 130 is moved to a next measurement point (Step 107). Then, returning to Step 101, the processes from the position adjustment using the guide light to the measurement using the measurement light are repeated (Step 101 to Step 105). When the measurement in all the measurement points is completed (Yes in Step 106), the measurement operation is terminated.

As described above, in the chromatic sensor 130 according to this embodiment, the measurement light source 41 that emits the measurement light (white light W) and the red laser light source 42 that emits the visible light beam (red laser light LR). The position of the irradiation spot in the first operation in which the white light W is radiated toward the object to be measured O from the optical head 10 and the position of the irradiation spot in the second operation in which the red laser light LR is radiated are identical to each other. Therefore, by adjusting the position of the irradiation spot of the red laser light LR, which is easily viewed, to the measurement point, it becomes possible to easily and precisely radiate the white light W to the measurement point.

For example, when a portion that is a measurement target is a member made of transparent material, a metal glossy surface, or the like, it may be difficult to view the irradiation spot of the white light W. In this embodiment, the monochromatic light is radiated as the guide light, and hence it is possible to easily view the position of the irradiation spot of that light.

The color of the guide light may be appropriately selected in a manner that depends on, for example, the material or color of the portion that is the measurement target. For example, by using the laser light sources or LED light sources of RGB, the light of each of colors of RGB can be easily used as the guide light. Moreover, light of each of colors of RGB is easily viewed, and hence it is very effective.

The light source section may be provided with a plurality of guide light sources that emit monochromatic light beams having different colors. Further, the color of the guide light may be selectable in a manner that depends on the type of the object to be measured O. Accordingly, it is effective, for example, when a plurality of types of objects to be measured O are measured.

By using the laser light source or LED light source as the guide light source, it becomes possible to radiate single-wavelength light having a stable wavelength as the guide light. As a result, it becomes easy to view the irradiation spot and possible to execute high-precision position adjustment.

Figure 5:
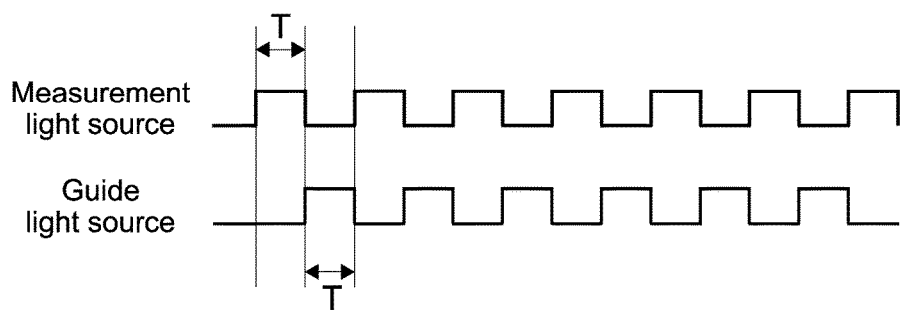
FIG. 5 is a diagram showing an example of switching and driving of a measurement light source and a guide light source.

FIG. 5 is a diagram showing an example of switching and driving of the measurement light source 41 and the guide light source 42. In the example shown in FIG. 5, driving of the measurement light source 41 and the guide light source 42 is switched every time interval T. In this case, a switching cycle is T*2=2T. For example, by generating and using two pulse signals whose pulse cycle is T and which have inverted phases, driving shown in FIG. 5 becomes possible, though of course not limited thereto. Switching and driving may be executed by using any clock signals or the like.

By reducing the time T shown in FIG. 5, the position measurement can be performed while checking the position of the irradiation spot. For example, when the plurality of measurement points are sequentially moved and measured, it is possible to check a movement path of positions of the irradiation spot and the irradiation spot in the measurement point while executing such measurement. Accordingly, scanning measurement or the like with respect to the object to be measured O also becomes possible.

For example, by setting a time interval of $\frac{1}{10}$ seconds or less as the time interval T, position measurement in each measurement point can be executed in a state in which the irradiation spot of the guide light can be substantially constantly visible. As a matter of course, the time interval is not limited thereto and may be appropriately set.

It should be noted that, when switching and driving are executed at high speed, a value output from the linear sensor 55 is obtained as data of a measurement result correspondingly to the driving timing of the measurement light source 41. Typically, the pixel number is constantly output from the linear sensor 55. Then, the pixel number output correspondingly to the driving timing of the measurement light source 41 is extracted by the control section 60 and the position of the object to be measured O is measured, though of course not limited thereto.

FIG. 6 is a schematic diagram for describing generation of a correction value using the guide light. For example, the position of the diffraction grating 52 or the linear sensor 55 may be deviated in a manner that depends on changes in environment such as temperature and humidity, a situation in carrying the chromatic sensor 130, or long-time use. In this case, the position of the spot on the linear sensor 55 is also deviated, and the measurement precision is lowered.

In this embodiment, it is possible to use a red laser LR (guide light) emitted to the object to be measured O in the second operation and calculate the correction value. Therefore, data for correction for calculating the correction value is stored in advance in the memory of the control section 60.

The data for correction includes a relative height of the optical head 10 with respect to an object to be measured for correction P and the pixel number when the red laser light LR is radiated to the object to be measured for correction P placed on the stage 110 and the reflection light S enters the linear sensor 55, that is, the pixel 56 outputting a predetermined peak value appears.

The object to be measured for correction P is an object having a determined height (position) and a specific configuration, material, and the like thereof are not limited.

A method of obtaining the data for correction is not limited. For example, when the contactless measurement system 100 is assembled and used, the data for correction is obtained by placing the object to be measured for correction P on the stage 110 and relatively moving the optical head 10 in a height direction. Alternatively, a theoretical value may be calculated on the basis of the height of the object to be measured P, a specific configuration of the spectroscope 50, the wavelength of the guide light, or the like and used as the data for correction.

It should be noted that, typically, the data for correction and the correction table shown in FIG. 3 are stored as data items corresponding to each other. For example, when the data for correction is obtained by calibration or the like, the correction table may be corrected on the basis of that data for correction.

Figure 6A:
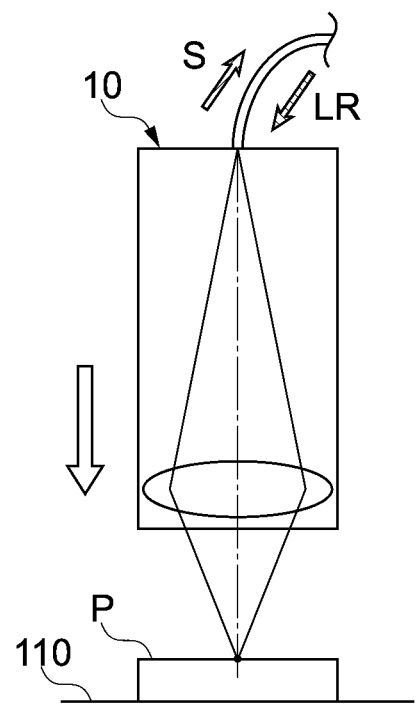
FIGS. 6A and 6B are schematic diagrams for describing generation of a correction value using guide light.
Figure 6B:
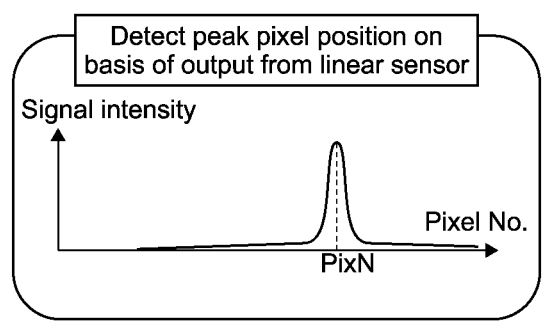

When the correction value is calculated, first of all, the object to be measured for correction P is placed on the stage 110. In a state in which the guide light source 42 is illuminated, a position of the optical head 10 is moved relative to the object to be measured P in the height direction. As shown in FIGS. 6A and 6B, when the red laser light LR is focused on the object to be measured P, the reflection light S is output toward the spectroscope 50 from the optical head 10. A pixel number indicating the spot position of the diffraction light L of the reflection light S is obtained. A difference (positive and negative values are inclusive) between the obtained pixel number and a pixel number stored as the data for correction is calculated as the correction value.

It should be noted that an output result of the linear sensor 55 can be monitored by the display of the PC 140 or the like and the operator may input a predetermined operation at a timing when the predetermined peak value is output. The correction value may be calculated on the basis of the pixel number at that timing.

When the position measurement is executed, the correction value is added to the pixel number output from the linear sensor 55. A value after the correction becomes a value input into the correction table and the position of the object to be measured O is calculated. Accordingly, it is possible to sufficiently enhance the precision of the position measurement. Moreover, the chromatic sensor 130 that is robust to changes in environment and has high precision can be realized.

A difference (positive and negative values are inclusive) between the relative height of the optical head 10 with respect to the object to be measured P and the height of the optical head 10 stored as the data for correction when the reflection light S is output by the optical head 10 may be calculated as the correction value. That correction value may be added to the position output by the correction table during position measurement. Accordingly, for example, it becomes possible to correct a measurement error arising from, for example, a positional deviation of the members inside the optical head 10.

As described above, the correction value can be easily calculated on the basis of the pixel number, the height of the optical head 10, or the like. As a matter of course, a calculation method for the correction value, a correction method using the correction value, and the like are not limited and may be appropriately set. For example, a plurality of correction tables corresponding to environmental temperature and the like may be stored and a correction table to be used may be selected from among the correction tables on the basis of the correction value. Moreover, the correction table itself may be corrected on the basis of the correction value. For example, the curve shape of the correction table shown in FIG. 3 or the like may be corrected.

Other Embodiments

The present invention is not limited to the embodiment described above, and various other embodiments can also be realized.

In the above description, the switching section that selectively switches between the first and second operations is realized by the optical fiber section 30 and the control section 60 that functions as the light source control section. The configuration of the switching section is not limited thereto and may be appropriately designed. For example, either one of the measurement light source 41 and the guide light source 42 may be connected to the optical fiber 31c shown in FIG. 1 in a switchable manner. For example, such a configuration can be realized by using a switching mechanism capable of switching between the positions of both the light sources. Accordingly, it becomes possible to reduce the number of fiber splitters 32 and reduce the loss of amount of light due to the fiber splitters 32.

When the plurality of measurement points are measured in order, the optical head 10 may be, before measurement, moved along the movement path, which is used in the measurement, in a state in which the guide light source 42 is illuminated. Accordingly, it becomes possible to view the movement path of the irradiation spot and check whether or not the movement path in the measurement is suitable. At this time, final the position adjustment in each measurement point may also be performed. By storing a coordinate value after such position adjustment in the memory, the positions of the plurality of measurement points can be efficiently measured without radiating the guide light (without switching to the second operation) during measurement.

For example, when the same measurement operations are executed on the same type of objects to be measured O, a time necessary for measurement can be greatly shortened by first checking the movement path using the guide light and performing position adjustment in each measurement point.

Further, in the above description, white light including the plurality of visible light beams is used as the measurement light. However, it is not limited thereto and other light of a large bandwidth may be used as the measurement light. In other words, light including ultraviolet rays, infrared rays, and the like that are invisible light beams may be used as the measurement light including the plurality of light beams having different wavelengths. The light source section may be provided with LEDs that emit ultraviolet rays, for example.

The controller 20 of the chromatic sensor 130 shown in FIG. 2 may be provided with functions of the PC 140, the display, and the like. On the other hand, some of the functions of the controller 20 may be executed by the PC 140. In this case, the chromatic sensor according to the present technology is constructed with such functions of the PC 140.

At least two of the feature portions of the present invention described above may be combined. Furthermore, the various effects described above are merely examples and should not be limited, and other effects may also be obtained.

What is claimed is:

1. A chromatic confocal sensor, comprising:
a first light source that emits measurement light including a plurality of light beams having different wavelengths;
a second light source that emits a visible light beam having a predetermined wavelength;
an optical head that causes incident light to be converged at a focal position corresponding to a wavelength of the incident light and outputs reflection light reflected by an object to be measured at the focal position;
a processor; and
a memory including a set of executable instructions that, when executed by the processor causes the processor to perform operations including:
calculating a position of the object to be measured on the basis of the reflection light output by the optical head; and
selectively switching between a first operation in which only the measurement light enters the optical head and a second operation in which at least the visible light beam enters the optical head,
generating, when the second operation is selected, a correction value used for calculating the position, on the basis of the reflection light obtained by the visible light beam being reflected by an object to be measured for correction at the focal position.

2. The chromatic confocal sensor according to claim 1, wherein
the second light source is a laser light source or an LED (Light Emitting Diode) light source.

3. The chromatic confocal sensor according to claim 1, wherein
the visible light beam is red light, blue light, or green light.

4. The chromatic confocal sensor according to claim 1, further comprising:
an optical fiber section that guides the measurement light emitted from the first light source and the visible light beam emitted from the second light source to the optical head, and
wherein the processor controls driving of each of the first light source and the second light source.

5. The chromatic confocal sensor according to claim 1, further comprising:
a spectroscope including
a diffraction grating that diffracts the reflection light output by the optical head, and
a sensor that receives diffraction light diffracted by the diffraction grating, and
wherein the processor calculates the position of the object to be measured on the basis of a light reception position of the diffraction light received by the sensor.

6. The chromatic confocal sensor according to claim 1, wherein
the processor switches between the first operation and the second operation every time interval of $1/10$ seconds or less.

7. The chromatic confocal sensor according to claim 1, further comprising:
a spectroscope including
a diffraction grating that diffracts the reflection light output by the optical head, and
a sensor that receives the diffraction light diffracted by the diffraction grating, and
wherein the processor calculates the position of the object to be measured on the basis of a light reception position of the diffraction light received by the sensor, and
the processor generates the correction value on the basis of a light reception position of the diffraction light obtained by the reflection light reflected by the object to be measured for correction being diffracted by the diffraction grating.

8. A measurement method, comprising:
causing a visible light beam having a predetermined wavelength to enter an optical head;
moving a position of an irradiation spot of the visible light beam emitted toward an object to be measured from the optical head onto a measurement point on the object to be measured;
causing a measurement light including a plurality of light beams having different wavelengths to enter the optical head;
converging, by the optical head, the plurality of light beams on different focal positions and outputting reflection light reflected by the object to be measured at the focal position; and
calculating the position of the object to be measured on the basis of the reflection light output by the optical head,
emitting the visible light beam toward an object to be measured for correction from the optical head; and
generating a correction value used for calculating the position, on the basis of the reflection light reflected by the object to be measured for correction at the focal position and output by the optical head.

* * * * *